United States Patent [19]
Grabowski et al.

[11] Patent Number: 5,750,448
[45] Date of Patent: May 12, 1998

[54] COPPER(II) OXIDE-CONTAINING ALUMINOPHOSPHATE GLASSES

[75] Inventors: Danuta Grabowski, Taunusstein; Uwe Kolberg, Mainz; Alwin Weitzel, Mainz; Magdalena Winkler-Trudewig, Mainz, all of Germany

[73] Assignee: Schott Glaswerke, Mainz, Germany

[21] Appl. No.: 764,009

[22] Filed: Dec. 11, 1996

[30] Foreign Application Priority Data

Dec. 12, 1995 [DE] Germany .................. 195 46 313.7

[51] Int. Cl.$^6$ .................. C03C 3/19; C03C 3/066; C03C 4/08
[52] U.S. Cl. .................. 501/47; 501/44; 501/48
[58] Field of Search .................. 501/44, 47, 48

[56] References Cited

U.S. PATENT DOCUMENTS

| | | | |
|---|---|---|---|
| 3,746,556 | 7/1973 | Morgan | 501/47 |
| 4,366,253 | 12/1982 | Yagi | 501/47 |
| 4,439,530 | 3/1984 | Tajima | 501/47 |
| 4,661,284 | 4/1987 | Cook et al. | 501/47 |
| 4,920,081 | 4/1990 | Beall et al. | 501/47 |
| 5,032,315 | 7/1991 | Hayden et al. | 501/47 |
| 5,153,151 | 10/1992 | Aitken | 501/47 |
| 5,173,456 | 12/1992 | Hayden et al. | 501/47 |
| 5,196,381 | 3/1993 | Hu et al. | 501/47 |
| 5,256,604 | 10/1993 | Aitken | 501/47 |
| 5,330,940 | 7/1994 | Aitken et al. | 501/47 |
| 5,529,960 | 6/1996 | Aitken et al. | 501/47 |
| 5,529,961 | 6/1996 | Aitken et al. | 501/47 |

FOREIGN PATENT DOCUMENTS

| | | |
|---|---|---|
| 29 26 721 | 11/1980 | Germany . |
| 34 14 682 A1 | 11/1985 | Germany . |
| 40 31 469 C1 | 2/1992 | Germany . |
| 52-068217 | 6/1977 | Japan .................. 501/47 |
| 55-121924 | 9/1980 | Japan . |
| 4-104918 | 4/1992 | Japan . |
| 6-234546 | 8/1994 | Japan . |

*Primary Examiner*—Anthony Green
*Attorney, Agent, or Firm*—Millen, White, Zelano, & Branigan, P.C.

[57] ABSTRACT

The invention relates to a copper(II) oxide-containing aluminophosphate glass having good chemical resistance, very good devitrification stability, high transmission at wavelengths in the range from 350 to 550 nm and a refractive index $n_d$ of from 1.52 to 1.54. The glass has the following composition (in % by weight, based on oxide): $Al_2O_3$ 4–9; $P_2O_5$ 67–75; BaO 0.5–6; CaO 0.1–1; MgO 0–4; SrO 0–1; ZnO 0.2–1; $\Sigma$BaO+CaO+MgO+SrO+ZnO 3.5–7; $Na_2O$ 1.5–5; $K_2O$ 2.5–3.5; $Li_2O$ 0.5–5; $\Sigma Na_2O+K_2O+Li_2O$ 5–13; $SiO_2$ 0–1; $B_2O_3$ 1–2.5; $As_2O_3$ 0.1–0.5; Cl$^-$ 0–0.3; F$^-$ 0–1.3; $CeO_2$ 0.2–0.4; CuO 1–6; with $K_G=\Sigma Al_2O_3+SiO_2+CeO_2/\Sigma P_2O_5+B_2O_3$ 0.06–0.125.

3 Claims, 3 Drawing Sheets

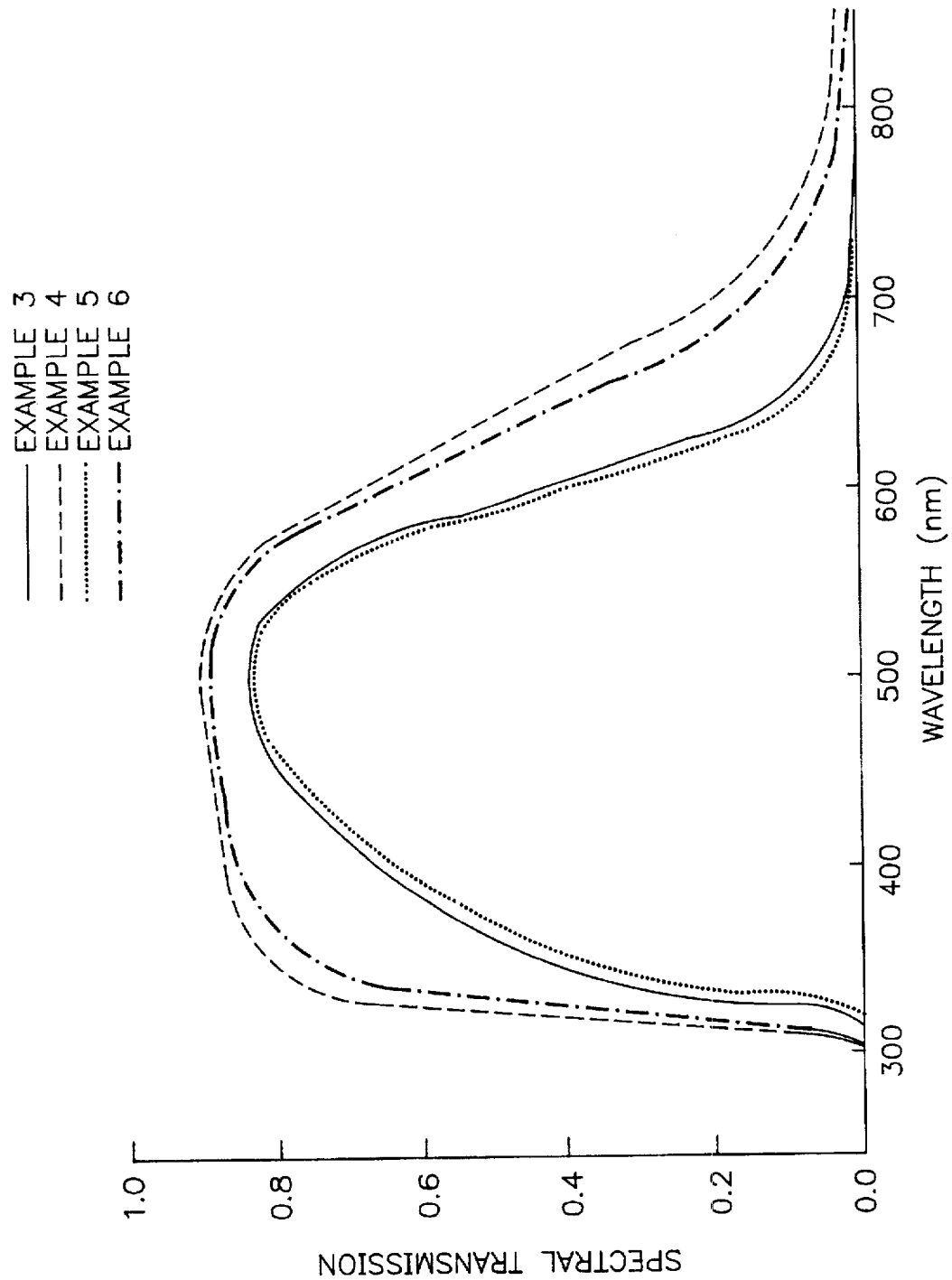

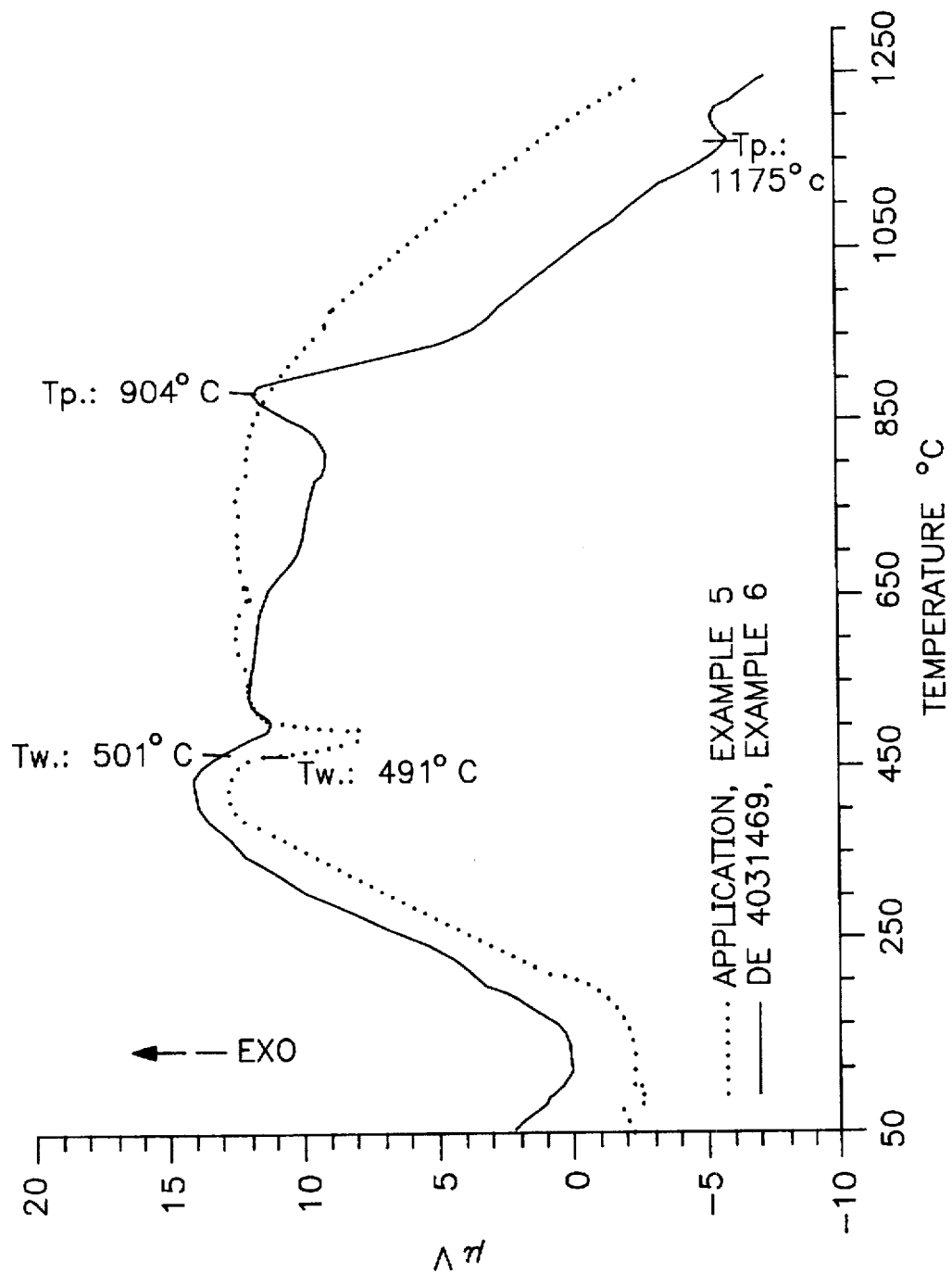

COPPER(II) OXIDE-CONTAINING ALUMINOPHOSPHATE GLASSES

BACKGROUND OF THE INVENTION

The invention relates to copper(II) oxide-containing aluminophosphate glasses having high transmission at wavelengths in the range from 350 to 550 nm and good chemical resistance and very good devitrification stability.

The novel glasses are optical bandpass filters, i.e., filters having a fairly narrow wavelength range of high transmission surrounded by two low-transmission regions. Glasses of this type are employed as optical glass filters, for example, as color filters in color video cameras.

In addition to high transparency between 350 and 550 nm, the novel glasses typically have a steep edge in the adjacent UV region and very low transmission above 700 nm. While the UV region should be blocked as completely as possible, for example, in order to avoid damage to sensitive electronic arrangements by high-energy radiation, the intensity of the incident radiation in the region>700 nm should be weakened so that, for example, when using video cameras, the red cast of the recording caused by the CCDs is compensated.

Besides the spectral characteristics, which are crucial for filter glasses, other glass properties are important for simple and inexpensive production and for practical use. In detail, these are the following:

Chemical Resistance:
  This includes acid resistance, alkali resistance and staining resistance. These properties are important for various reworking processes.
Crystallization stability:
  This property must be particularly pronounced for industrial production of the filter glasses.
Glass transition temperature $T_g$:
  The position of $T_g$ is important, since both mechanical and optical properties can change irreversibly above $T_g$.
Coefficient of thermal expansion α:
  This is relevant for working and for possible thermal prestresses of the surface.

A large number of CuO-containing glasses having similar transmission properties have already been disclosed.

The glasses described in DE 29 26 721 C2 are low-alkali; they contain only up to 1.1% by weight of $Na_2O$ and only up to 6.5% by weight of alkali metal oxides in total. In spite of their high $P_2O_5$ content of at least 71% by weight, they are difficult to melt owing to the low alkali content and the high proportion of $Al_2O_3$ of at least 8.6% by weight. In order to facilitate the melting operation, they require at least 2.4% by weight of $B_2O_3$. Besides CuO, $CeO_2$ is used as colorant. These glasses have a relatively high ratio between crystallizers and glass formers, which has an adverse effect on the devitrification stability.

DE 34 14 682 C2 describes glasses which, in addition to CuO, contain a relatively high proportion of the expensive raw material $CeO_2$, namely from 0.45 to 2.0% by weight. The fairly high alkali metal oxide content of up to 17% by weight has an adverse effect on the chemical resistance.

DE 40 31 469 C1 describes glasses which additionally contain $V_2O_5$ besides CuO as the principal colorant and (if desired even up to 3.0% by weight) of $CeO_2$ and further optional dyes. The ratio between crystallizers and glass formers, which affects the crystallization stability, is disadvantageously high in these glasses.

An extremely wide variety of glasses are known which, in addition to the constituents mentioned above, contain further components, such as $SnO_2$, $Nd_2O_3$ and $Fe_2O_3$, in order to achieve the filter properties mentioned.

Although, as can be seen, various CuO-containing phosphate glasses already exist, there continues to be a demand for improved glasses, the object of the present invention being the simple production of an entire family of individual glass types having variable properties.

In order to obtain a wide range of glasses with the outlined extreme filter properties in a broad spectral region, the current prior art uses not only numerous dyes in various concentrations, but also many different components for formulating the base glasses.

In the producing areas, this results in enormous storage costs (multiplicity of types of raw material), possible confusion between the components and raw materials and thus in stoppages during glass production.

It is furthermore impossible to melt the glasses directly one after the other, since the base glasses are not compatible with one another. Flushing melts are therefore necessary, which firstly slow production and secondly are expensive.

SUMMARY OF THE INVENTION

The object of the present invention is to obtain a glass family having a synthesis range by means of which it is possible to optimize said physical properties for each individual type of glass. The variation in synthesis within the glass family should be such that the various transmission properties of the individual types of glass are only achieved through the different concentration of the color components and no longer by variations in the base glass.

The requirement is, therefore, for a glass family whose glasses can be remelted directly into one another have good chemical resistance and very good devitrification stability, and have a certain transmission and absorption behavior over a certain region, irrespective of the synthesis of the base glass . The following details apply to transmission:
  highest possible radiation blockage in the spectral region $\lambda \leq 350$ nm.
  highest possible transmission in the visible, non-red spectral region, i.e., between 380 nm and about 570 nm. The transmission maximum should as far as possible coincide with the maximum sensitivity of the human eye (about 540 nm).
  Best possible radiation blockage in the spectral region $X \geq 700$ nm.
  The window width should be variable so that the transmission in the UV and in the visible region can be matched to various specifications, independently of the blockage in the spectral region $X \geq 700$ nm. The consequence of this is that the coloring cannot be effected solely by means of CuO. Ideally (achieved in the present invention), the addition of a further dye is sufficient.

This object is achieved by means of a glass of the present invention. Thus, the novel glass comprises (% by weight, based on oxide):

| | |
|---|---|
| $Al_2O_3$ | 4–9 |
| $P_2O_5$ | 67–75 |
| BaO | 0.5–6 |
| CaO | 0.1–1 |
| MgO | 0–4 |

| -continued | |
|---|---|
| SrO | 0–1 |
| ZnO | 0.2–1 |
| Σ BaO + CaO + MgO + SrO + ZnO | 3.5–7 |
| Na$_2$O | 1.5–5 |
| K$_2$O | 2.5–3.5 |
| Li$_2$O | 0.5–5 |
| Σ Na$_2$O + K$_2$O + Li$_2$O | 5–13 |
| SiO$_2$ | 0–1 |
| B$_2$O$_3$ | 1–2.5 |
| As$_2$O$_3$ | 0.1–0.5 |
| Cl$^-$ | 0–0.3 |
| F$^-$ | 0–1.3 |
| CeO$_2$ | 0.2–0.4 |
| CuO | 1–6 |
| with K$_G$ = Σ Al$_2$O$_3$ + SiO$_2$ + CeO$_2$/ Σ P$_2$O$_5$ + B$_2$O$_3$ | 0.06–0.125 |

The magnitude of this ratio K$_G$ between crystallizers and glass formers is essential to the invention. It is known that a high proportion of Al$_2$O$_3$ in phosphate glasses results in crystallization owing to deposition of AlPO$_4$ crystals. Likewise, SiO$_2$ and CeO$_2$ are incompatible with the phosphate glass matrix. On the other hand, the minimum amount of 4% by weight of Al$_2$O$_3$ is necessary to ensure adequate chemical resistance. Surprisingly, it has been found that a linear increase in crystallization with the A$_2$O$_3$ content does not occur in the novel glass, but instead the K$_G$ defined above describes a limit to the crystallization stability. Thus, K$_G$ must not exceed the value 0.125. On the other hand, a K$_G$ of at least 0.06 is required for the requisite chemical resistance.

By contrast, glasses whose ratio K$_G$ is greater than 0.125 exhibit considerable crystallization. To illustrate this, FIG. 3 shows the results of DTA analysis. The dotted line represents the DTA curve of the glass from Example 5 having a K$_G$ of 0.124. The comparison is the curve for a remelt of a glass from DE 40 31 469 Cl (Example 6 therein) (solid line). This comparative glass has the following composition (in % by weight; based on oxide): Al$_2$O$_3$ 7.7; P$_2$O$_5$ 76.4; BaO 0.6; CaO 0.2; MgO 2.7; ZnO 0.6; Na$_2$O 2.8; K$_2$O 0.2; SiO$_2$ 1.2; As$_2$O$_3$ 0.14; F$^-$ 0.14; CeO$_2$ 1.8; CuO 5.5; V$_2$O$_5$ 0.025. The ratio K$_G$ works out at 0.14.

Each of the two curves has an endothermal peak T$_n$, which corresponds approximately to the T$_g$. However, the crucial factor is the two exothermal peaks in the continuous curve. These correspond to the region of formation of a crystal phase, i.e., crystallization occurs in the glass between these two peaks. The position of the lower-temperature peak maximum corresponds approximately to the maximum nucleation temperature (KG$_{max}$), and the peak area corresponds to the number of crystals formed. It can be seen that quite extensive crystallization occurs in the glass of DE 40 31 469 Cl at about 904° C. This process continues up to about 1200° C. Above this temperature, the crystals formed re-dissolve. This upper devitrification limit means that the casting temperature must be set at a very high value for a phosphate glass, which, as is known, has an adverse effect on the streak quality. Furthermore, large castings cannot be produced from this glass, since the high heat content means that the critical temperature region cannot be passed through sufficiently quickly.

These problems do not occur in the novel glass, since no crystallization takes place here (no exothermal DTA peak). The cause of this is the different K$_G$ values.

The statements made on the basis of the DTA analyses are confirmed by observations in the melts.

In the novel glasses, the CuO content can be varied within a relatively broad range, namely between 1 and 6% by weight. In this way, the bandwidth of the transmission region can be adjusted through a certain Cu$^{2+}$ concentration. Thus, an increase in the concentration of Cu$^{2+}$ ions at the band center determined by the type of coloring ions and also by the composition of the base glass, causes the absorption bands in the UV and IR to become stronger, shifting the respective edges into the visible region and reducing the bandwidth.

Variation of the bandwidth requires relatively large changes in concentration. In the case of CeO$_2$, by contrast, even small amounts and extremely small changes in concentration cause effects. In the glass composition region according to the invention, in contrast to DE 34 14 682 C2, even a CeO$_2$ content of 0.1 to 0.4% by weight is sufficient. Since this is an expensive raw material, this aspect is important for low-cost production.

In comparison with DE 29 26 721 C2, the novel glass has a high content of alkali metal oxides .(up to 13% by weight) and specifically of Na$_2$O (1.5–5% by weight). This lowers the melting point, which significantly simplifies production. On the other hand, the alkali content is sufficiently low to ensure good chemical resistance.

In contrast to the glasses from DE 40 31 469 Cl, the novel glass does not require any V$_2$O$_5$. Other than described in DE 40 31 469 Cl, no further improvement in the steepness of the IR edge is achieved by adding V$_2$O$_5$; indeed, V$_2$O$_5$ slightly reduces the transmission in the region between 450 and 500 nm, owing to low oxidation states of the vanadium.

Since redox processes normally always occur in the glass, resulting in the formation of various oxidation states in the case of polyvalent elements, the said disadvantages of vanadium must either be accepted, or the melting process must be carried out under highly oxidizing conditions, but this would in turn result in an undesired increased attack on the Pt (melting crucible), and Pt particles would enter the glass. This excludes such glasses from, for example, laser applications.

The result that the addition of V$_2$O$_5$ is totally unnecessary is all the more valuable. The logistics of batch preparation are consequently also simplified.

If the transmission properties in a certain region are independent of the base glass synthesis (for a constant dye concentration), further properties can be modified within this region by changing the base glass synthesis without the fear of further significant changes in transmission. An object of this type is not trivial, since on the one hand some properties should as far as possible be only slightly dependent on the composition, whereas others should vary as greatly as possible. The novel glass makes these requirements possible.

One of the properties that has to be matched in this way is the glass transition temperature T$_g$:

1. Glasses that are to be shaped by sagging and thus given a relatively complex geometry which is either totally impossible direct from a melt or by grinding and polishing or is only possible at high expense should have the lowest possible T$_g$, which should also be far away from the crystallization temperatures.

2. Glasses which are used in lighting equipment or are exposed to high temperatures in another way should have the highest possible T$_g$. This firstly prevents deformation and secondly thermal tempering (toughening) carried out if required is thus retained for the longest possible time.

This gives two preferred composition ranges for the novel glass (% by weight, based on oxide), namely for glasses of relatively low transition temperature:

| | |
|---|---|
| Al₂O₃ | 4–5 |
| P₂O₅ | 67–70 |
| BaO | 4.5–6 |
| CaO | 0.3–1 |
| MgO | 0–1 |
| SrO | 0–1 |
| ZnO | 0.2–0.6 |
| Σ BaO + CaO + MgO + SrO + ZnO | 5–7 |
| Na₂O | 4–5 |
| K₂O | 2.5–3.5 |
| Li₂O | 4–5 |
| Σ Na₂O + K₂O + Li₂O | 10.5–13 |
| SiO₂ | 0–1 |
| B₂O₃ | 1–1.5 |
| As₂O₃ | 0.1–0.4 |
| Cl⁻ | 0–0.3 |
| F⁻ | 0–1.3 |
| CeO₂ | 0.2–0.4 |
| CuO | 1–6 |
| with $K_G = \Sigma Al_2O_3 + SiO_2 + CeO_2/\Sigma P_2O_5 + B_2O_3$ | 0.06–0.09 | and for glasses of relatively high transition temperature:

| | |
|---|---|
| Al₂O₃ | 7.5–9 |
| P₂O₅ | 72–75 |
| BaO | 0.5–1 |
| CaO | 0.1–0.5 |
| MgO | 3–4 |
| SrO | 0–1 |
| ZnO | 0.2–0.6 |
| Σ BaO + CaO + MgO + SrO + ZnO | 5–6 |
| Na₂O | 1.5–2 |
| K₂O | 3–3.5 |
| Li₂O | 0.5–1 |
| Σ Na₂O + K₂O + Li₂O | 5–6 |
| SiO₂ | 0.1–1 |
| B₂O₃ | 1.5–2.5 |
| As₂O₃ | 0.1–0.3 |
| Cl⁻ | 0–0.3 |
| F⁻ | 0–0.5 |
| CeO₂ | 0.2–0.4 |
| CuO | 1–6 |
| with $K_G = \Sigma Al_2O_3 + SiO_2 + CeO_2/\Sigma P_2O_5 + B_2O_3$ | 0.095–0.125 |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application German P 195 46 313.7 are hereby incorporated by reference.

EXAMPLES

Six examples of novel glasses were produced from conventional raw materials. Table 1 shows their compositions and some essential properties. Examples 1 and 2 correspond to glasses of low transition temperature, required, for example, for subsequent thermal shaping, whereas Examples 3 to 6 describe glasses of high transition temperature, suitable, for example, for use in lighting applications.

The following abbreviations are used:

$K_G = \Sigma Al_2O_3 + SiO_2 + CeO_2/\Sigma P_2O_5 + B_2O_3$
$n_d$=refractive index at 587.56 nm
$T_g$=glass transition temperature
$\alpha$=coefficient of thermal expansion.

TABLE 1

| | Glass compositions (in % by weight, based on oxide) | | | | | |
|---|---|---|---|---|---|---|
| | 1 | 2 | 3 | 4 | 5 | 6 |
| Al₂O₃ | 4.32 | 4.45 | 8.47 | 8.76 | 8.45 | 8.72 |
| P₂O₅ | 67.72 | 69.85 | 72.20 | 74.69 | 72.03 | 74.28 |
| BaO | 5.73 | 5.91 | 0.61 | 0.63 | 0.61 | 0.63 |
| CaO | 0.65 | 0.67 | 0.36 | 0.37 | 0.36 | 0.37 |
| MgO | | | 3.50 | 3.62 | 3.48 | 3.59 |
| ZnO | 0.26 | 0.27 | 0.58 | 0.60 | 0.58 | 0.60 |
| Na₂O | 4.62 | 4.77 | 1.77 | 1.83 | 1.76 | 1.81 |
| K₂O | 2.96 | 3.05 | 3.23 | 3.34 | 3.22 | 3.33 |
| Li₂O | 4.62 | 4.77 | 0.55 | 0.57 | 0.55 | 0.57 |
| SiO₂ | | | 0.48 | 0.50 | 0.48 | 0.50 |
| B₂O₃ | 1.13 | 1.17 | 2.34 | 2.43 | 2.34 | 2.41 |
| CeO₂ | 0.35 | 0.36 | 0.29 | 0.30 | 0.29 | 0.30 |
| As₂O₃ | 0.17 | 0.18 | 0.24 | 0.25 | 0.24 | 0.25 |
| Cl⁻ | 0.28 | 0.29 | | | | |
| F⁻ | 1.24 | 1.28 | 0.27 | 0.28 | 0.27 | 0.28 |
| CuO | 5.93 | 2.97 | 5.11 | 1.85 | 5.34 | 2.38 |
| BaO + CaO + MgO + ZnO | 6.64 | 6.85 | 5.05 | 5.22 | 5.03 | 5.19 |
| R₂O | 12.20 | 12.59 | 5.55 | 5.74 | 5.53 | 5.71 |
| K_G | 0.068 | 0.068 | 0.124 | 0.124 | 0.124 | 0.124 |
| n_d | 1.5367 | 1.5280 | 1.5361 | 1.5295 | 1.5363 | 1.5365 |
| T_g [°C] | 316 | 307 | 471 | 480 | 473 | 481 |
| $\alpha_{20/200}$ [10⁻⁶/K] | 13.5 | 13.8 | 8.8 | 8.9 | 8.8 | 8.8 |

The refractive indices fell within the range of 1.52–1.54. The transmission curves (spectral transmission versus wavelength) of the six examples for the range from 300 to 800 nm are shown in FIGS. 1 (Examples 1 and 2) and 2 (Examples 3 to 6). The transmission properties relate to a sample thickness of 1 mm+0.02 mm.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 2 is a graph of "spectral transmission" vs. wavelength (nm) for Examples 3–6 herein; and FIG. 3 is a graph of differential thermoanalysis (µV vs. temperature (° C.)) of the glass from Example 5 herein and a remelt of a glass from DE 40 31 469 C1 (Example 6 therein).

Figure 1:
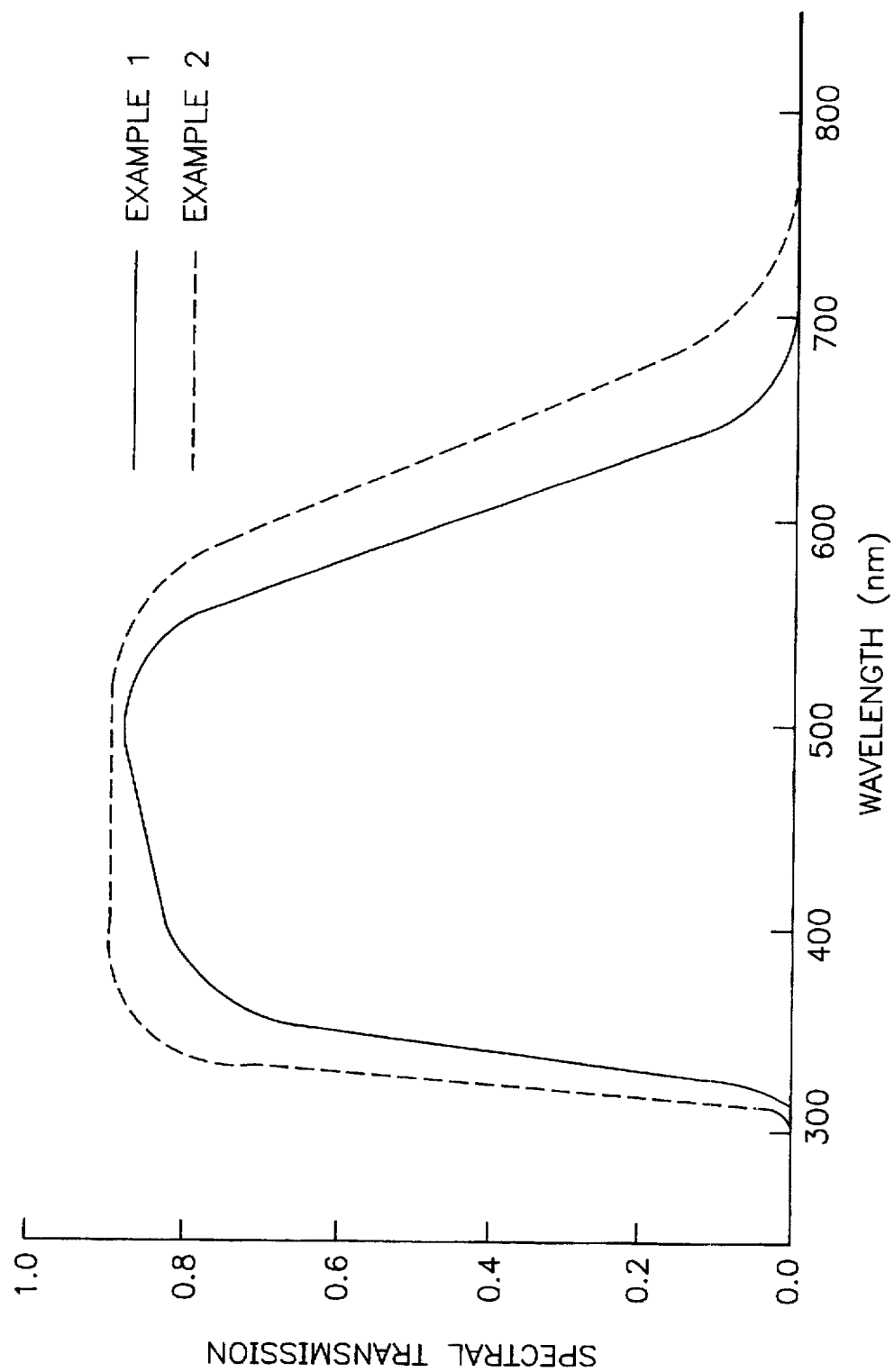
FIG. 1 is a graph of "spectral transmission" vs. wavelength (nm) for Examples 1 and 2 herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Copper (II) oxide-containing aluminophosphate glass comprising (in % by weight, based on oxide):

| | |
|---|---|
| $Al_2O_3$ | 4–9 |
| $P_2O_5$ | 67–75 |
| BaO | 0.5–6 |
| CaO | 0.1–1 |
| MgO | 0–4 |
| SrO | 0–1 |
| ZnO | 0.2–1 |
| $\Sigma$ BaO + CaO + MgO + SrO + ZnO | 3.5–7 |
| $Na_2O$ | 1.5–5 |
| $K_2O$ | 2.5–3.5 |
| $Li_2O$ | 0.5–5 |
| $\Sigma Na_2O + K_2O + Li_2O$ | 5–13 |
| $SiO_2$ | 0–1 |
| $B_2O_3$ | 1–2.5 |
| $As_2O_3$ | 0.1–0.5 |
| $Cl^-$ | 0–0.3 |
| $F^-$ | 0–1.3 |
| $CeO_2$ | 0.2–0.4 |
| CuO | 1–6 |
| with $K_G = EAl_2O_3 + SiO_2 + CeO_2/EP_2O_5 + B_2O_3$ and having a refractive index, $n_d$, of from 1.52 to 1.54. | 0.06–0.125 |

2. Aluminophosphate glass according to claim 1 comprising (in % by weight, based on oxide):

| | |
|---|---|
| $Al_2O_3$ | 4–5 |
| $P_2O_5$ | 67–70 |
| BaO | 4.5–6 |
| CaO | 0.3–1 |
| MgO | 0–1 |
| SrO | 0–1 |
| ZnO | 0.2–0.6 |
| $\Sigma$ BaO + CaO + MgO + SrO + ZnO | 5–7 |
| $Na_2O$ | 4–5 |
| $K_2O$ | 2.5–3.5 |
| $Li_2O$ | 4–5 |
| $\Sigma Na_2O + K_2O + Li_2O$ | 10.5–13 |
| $SiO_2$ | 0–1 |
| $B_2O_3$ | 1–1.5 |
| $As_2O_3$ | 0.1–0.4 |
| $Cl^-$ | 0–0.3 |
| $F^-$ | 0–1.3 |
| $CeO_2$ | 0.2–0.4 |
| CuO | 1–6 |
| with $K_G = \Sigma Al_2O_3 + SiO_2 + CeO_2/\Sigma P_2O_5 + B_2O_3$ | 0.06–0.09. |

3. Aluminophosphate glass according to claim 1, comprising (in % by weight, based on oxide):

| | |
|---|---|
| $Al_2O_3$ | 7.5–9 |
| $P_2O_5$ | 72–75 |
| BaO | 0.5–1 |
| CaO | 0.1–0.5 |
| MgO | 3–4 |
| SrO | 0–1 |
| ZnO | 0.2–0.6 |
| $\Sigma$ BaO + CaO + MgO + SrO + ZnO | 5–6 |
| $Na_2O$ | 1.5–2 |
| $K_2O$ | 3–3.5 |
| $Li_2O$ | 0.5–1 |
| $\Sigma Na_2O + K_2O + Li_2O$ | 5–6 |
| $SiO_2$ | 0.1–1 |
| $B_2O_3$ | 1.5–2.5 |
| $As_2O_3$ | 0.1–0.3 |
| $Cl^-$ | 0–0.3 |
| $F^-$ | 0–0.5 |
| $CeO_2$ | 0.2–0.4 |
| CuO | 1–6 |
| with $K_G = \Sigma Al_2O_3 + SiO_2 + CeO_2/\Sigma P_2O_5 + B_2O_3$ | 0.095–0.125 |

\* \* \* \* \*